United States Patent [19]

Teot et al.

[11] Patent Number: 4,725,372
[45] Date of Patent: Feb. 16, 1988

[54] AQUEOUS WELLBORE SERVICE FLUIDS

[75] Inventors: Arthur S. Teot; Muthyala Ramaiah, both of Midland, Mich.; Mitchael D. Coffey, Jenks, Okla.

[73] Assignee: The Dow Chemical Company, Midland, Mich.

[21] Appl. No.: 456,161

[22] Filed: Jan. 6, 1983

Related U.S. Application Data

[63] Continuation of Ser. No. 200,760, Oct. 27, 1980, abandoned.

[51] Int. Cl.$^4$ .................. E21B 43/00; C09K 7/02
[52] U.S. Cl. .................. 252/8.514; 252/8.551; 252/315.2
[58] Field of Search ............ 252/8.5 C, 8.5 A, 8.55 R, 252/8.55 C, 315.1, 8.51, 8.514, 8.551, 8.553

[56] References Cited

U.S. PATENT DOCUMENTS

| | | | |
|---|---|---|---|
| 2,805,722 | 9/1957 | Morgan et al. | 252/8.55 X |
| 3,126,950 | 3/1964 | Carlberg et al. | 252/8.55 X |
| 3,282,849 | 11/1966 | Diehn et al. | 252/106 |
| 3,373,107 | 3/1968 | Rice et al. | 252/8.55 |
| 4,046,197 | 9/1977 | Gruesbeck et al. | 252/8.55 X |
| 4,061,580 | 12/1977 | Jahnke | 252/8.55 |
| 4,108,782 | 8/1978 | Thompson | 252/8.55 |
| 4,143,007 | 3/1979 | De Martino | 252/8.55 |
| 4,250,044 | 2/1981 | Hinkel | 252/8.55 |
| 4,304,677 | 12/1981 | Stauffer et al. | 252/8.55 |

Primary Examiner—Herbert B. Guynn
Attorney, Agent, or Firm—Bruce M. Kanuch

[57] ABSTRACT

A wellbore service fluid is provided which contains water, a water soluble electrolyte and as a thickening agent at least one of an amine, a salt of an amine, or quaternary ammonium salt which functions to increase the viscosity of the fluid in the presence of said electrolyte.

5 Claims, No Drawings

AQUEOUS WELLBORE SERVICE FLUIDS

This is a continuation of application Ser. No. 200,760 filed Oct. 27, 1980, now abandoned.

BACKGROUND OF THE INVENTION

This invention relates to aqueous wellbore service fluids, including drilling fluids, completion fluids, work over fluids, packer fluids, fracturing fluids and the like, which may be employed in various well servicing operations. More specifically, it relates to thickened, substantially solids-free high electrolyte-containing aqueous fluids which are employed as a base fluid to prepare many types of wellbore service fluids.

Essentially solids-free aqueous fluids containing electrolytes have some advantages over clay-based fluids for preparing wellbore service fluids because: (a) they do not normally contain undesirable solids which can cause formation damage, (b) they contain hydration inhibiting materials such as potassium chloride, calcium chloride or the like, which are important to prevent damage to clay containing formations, and (c) they can be prepared over a wide range of densities.

The viscosity of high electrolyte-containing aqueous fluids is, however, difficult to control because of the high electrolyte concentration. Thickened fluids are desirable for carrying solids, e.g., in cleaning out wells, drilling and the like. Likewise, thickened fluids resist water loss, which may be damaging to petroleum producing subterranean formations.

Hydroxy alkyl celluloses have been employed to thicken electrolyte-containing aqueous fluids to improve the solid carrying capacity thereof. Likewise, starch has been employed to aid in water loss control of these fluids, but with limited success. However, these materials are difficult to disperse and dissolve in concentrated electrolytes at ambient temperature; the viscosity of the resulting solutions tend to decrease with an increase in temperature; and the hydroxy alkyl celluloses are subject to shear degradation under normal operating conditions.

Certain quaternary ammonium salts have been shown to impart viscoelastic properties to aqueous solutions, S. Gravsholt "Viscoelasticity in Highly Dilute Aqueous Solutions of Pure Cationic Detergents", Journal of Colloid and Interface Science, Vol. 57, No. 3, December 1976, pp. 575-577. Gravsholt showed that cetyl trimethyl ammonium bromide would not impart viscoelastic properties to water but that cetyl trimethyl ammonium salicylate and certain other aromatic anion-containing quaternary amines would. In U.S. Pat. No. 3,292,698, a mixture of cyclohexyl ammonium chloride and undecane-3-sodium sulfate was taught to induce viscoelastic properties to a formation flooding liquid containing less than about 3.5 percent by weight of sodium chloride. Higher levels of sodium chloride were said to destroy the viscoelastic properties of the fluid. In British Pat. No. 1,443,244, a specific ethoxylated or propoxylated tertiary amine is employed to thicken an aqueous solution of a strong mineral acid. U.S. Pat. No. 3,917,536 teaches that certain primary amines may be employed in subterranean formation acidizing solutions to retard the reaction of the acid on the formation. The amine may be more readily dispersed into the acid solution with the use of a dispersing agent such as a quaternary amine.

It is a feature of the present invention to provide a high electrolyte-containing aqueous wellbore service fluid which has improved viscosity characteristics over a wide range of wellbore conditions; is easier to prepare at the well site and has better shear stability and consistent viscosity over a wide temperature range.

The improved aqueous wellbore service fluid of the present invention can be employed in well-known wellbore services such as, perforation, clean-up, long term shut-ins, drilling, placement of gravel packs, and the like. These services are well known in the art and are taught, for example, in U.S. Pat. Nos. 3,993,570; 3,126,950; 2,898,294 and C. M. Hudgens et al "High Density Packer Fluids Pay Off in South Louisiana": World Oil, 1961, pp. 113-119. The teachings of these publications are specifically incorporated herein by reference.

As employed herein, "ppg" means pounds per gallon. Also, when "percent" or "%" are employed, they mean percent by weight unless otherwise specified.

SUMMARY OF THE INVENTION

The present invention comprises an aqueous fluid comprising water, a sufficient quantity of at least one water soluble salt (electrolyte) which functions to increase the density of said fluid to a predetermined level and a sufficient quantity of at least one thickening agent selected from the group consisting of an amine (primary, secondary or tertiary), a salt of such amine or a quaternary ammonium salt of such amine including heterocyclic amine salts and quaternary ammonium salts wherein the nitrogen atom is present in a 5 or 6 member ring structure. Useful amines include those corresponding to the formula:

wherein $R_1$ is at least about a $C_{16}$ aliphatic group which may be branched or straight chain and which may be saturated or unsaturated. The maximum number of carbons in the $R_1$ group is primarily dependent on the type of $R_2$ and $R_3$ groups, and the concentration of the water soluble salt; preferably $R_1$ contains no more than about 30 carbon atoms.

$R_2$ and $R_3$ are independently hydrogen or a $C_1$ to about $C_6$ aliphatic group which can be branched or straight chained, saturated or unsaturated, and which may be substituted with a hydrophilic group which will render the $R_2$ and/or $R_3$ group more hydrophilic such as, for example, by replacing one or more hydrogen atoms with an —OH and/or amide group. $R_2$ and $R_3$ groups containing a hydrophilic substituent are preferred in aqueous solutions having higher electrolyte concentrations because they increase the electrolyte compatibility of the thickener.

Salts of such amines which can be employed correspond to the formula:

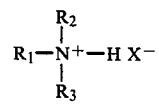

wherein $R_1$, $R_2$ and $R_3$ are the same as defined directly hereinbefore and $X^-$ is an inorganic or organic salt forming anion.

Quaternary ammonium salts of the amines corresponding to the formula

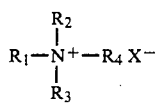

wherein $R_1$, $R_2$, $R_3$ and $X^-$ are the same as hereinbefore defined and $R_4$ can independently constitute the same group as $R_2$ or $R_3$ except that none of $R_1$, $R_2$, $R_3$ or $R_4$ are hydrogen. In addition, the $R_2$, $R_3$ and $R_4$ groups may be formed into a heterocyclic ring structure which includes the nitrogen atom of the amine.

The aqueous fluid can be employed to service a wellbore in a manner well-known in the art.

DETAILED DESCRIPTION OF THE INVENTION

The aqueous wellbore service fluid may have a density ranging from as low as about 8.5 ppg, preferably about 12 ppg, to about 21 ppg. It has been found that the higher density fluids are more difficult to thicken because of the high electrolyte content. It is at these higher densities, e.g. about 15 ppg and higher, that the practice of the present invention is particularly useful. However, advantages are also achieved in the lower density fluids.

The density is achieved by dissolving one or more water soluble inorganic salts in water to provide a substantially solids-free fluid. Naturally occurring brines and seawater can be employed if desired. Preferably, the aqueous wellbore service fluid contains at least about 3 percent of a water soluble salt of potassium, calcium or sodium. In addition, the aqueous fluid may contain other soluble salts of, for example, zinc, lithium, chromium, iron, copper, and the like. Preferably inorganic chlorides and/or bromides are employed because of the high density which can be achieved, but other salts such as sulfates, nitrates, etc. can be employed. The only restriction is that the salts must be compatible with the particular thickening agent employed to thicken the aqueous fluid. By compatible it is meant, for example, that the salt does not detrimentally interfere with the thickening function of the thickening agent and/or undesirable quantities of precipitates are formed. As examples of useful water soluble salts, reference may be had to Table I, Column 3, of U.S. Pat. No. 2,898,294, the teachings of which are specifically incorporated herein by reference.

One preferred aqueous wellbore service fluid contains a mixture of at least calcium bromide and zinc bromide to provide an aqueous solution having a density of at least about 15 ppg. The solution may also contain other water soluble salts such as calcium chloride and the like.

A preferred aqueous solution for use in deep wells requiring a fluid having a density greater than about 15 ppg is one which contains, as percent by weight:
$ZnBr_2$: about 5% to about 35%;
$CaBr_2$: about 25% to about 45%;
$CaCl_2$: about 5% to about 20%;
water: about 30% to about 40%; and
thickener about 0.5% to about 2%.

A preferred thickening agent for the above defined fluid having a density of above about 16.5 ppg is a tertiary amine of the formula $C_{18}H_{35}N(CH_2CH_2OH)_2$.

The thickening agent employed in the invention comprises at least one of the thickening agents defined hereinbefore under Summary of the Invention. It is found that with certain solutions, a mixture of two or more thickeners may be preferred.

Preferably, $X^-$ is an inorganic anion such as a sulfate, nitrate, perchlorate or halide. A halide, (Cl, Br or I) is preferred, Cl and Br being most preferred. $X^-$ may also be an aromatic organic anion such as salicylate, naphthalene sulfonate, p and m chlorobenzoates, 3,5 and 3,4 and 2,4-dichlorobenzoates, t-butyl and ethyl phenate, 2,6 and 2,5-dichlorophenates, 2,4,5-trichlorophenate, 2,3,5,6-tetrachlorophenate, p-methyl phenate, m-chlorophenate, 3,5,6-trichloropicolinate, 4-amino-3,5,6-trichlorpicolinate, 2,4-dichlorophenoxyacetate, toluene sulfonate α, β-naphthols, p.p′bisphenol A. The thickening agent should be chosen such that the anion is compatible with the electrolyte present in the aqueous solution such that undesirable precipitates are not formed. Also, the specific anion chosen will depend to some degree on the specific amine structure.

The thickening agent is employed in an amount which is sufficient to increase the viscosity of the aqueous fluid at least 50 percent over the viscosity thereof without the addition of the thickener as measured on a Haake Rotovisco Viscometer at about 20° C. and a shear rate of 160 $sec^{-1}$.

The exact quantity and specific thickener or mixture of thickeners to be employed will vary depending on the concentration of and specific soluble salt(s) employed to make up the solution, the viscosity desired, the temperature of use, the pH of the solution, and other similar factors. The concentration of the thickener can range from about 0.05 to about 5 percent, preferably from about 0.2 to about 3 percent of the aqueous wellbore service fluid. Simple laboratory procedures can be employed to determine the optimum conditions for any particular set of parameters. For example, when a non-protonated amine is employed as the thickener, the pH of the aqueous fluid can affect to some degree the effectiveness of particular amines. More acidic solutions are required for some amines to be dissolved therein. It is thought that this is because the amine must become protonated before it will become effectively dissolved in the fluid.

Specific wellbore service fluids found to be useful in the practice of the invention are set forth in the following Table I.

TABLE I

| Solution No. | Thickener | Concentration of Thickener Percent by wt. | Water Soluble Salt | Concentration Water Soluble Salt Percent by Weight Solution #1 | Solution #2 |
|---|---|---|---|---|---|
| 1 | $C_{16}H_{33}N(CH_3)_3$ salicylate | 1 | $CaBr_2$ | 40 | |
| 2 | $C_{16}H_{33}N(CH_3)_3$ salicylate | 0.5 | $CaBr_2$ | 46.7 | |
| 3 | Oleyl Methyl bis(2-hydroxyethyl) ammonium chloride (OMB) | 0.5 | $CaBr_2$ | 53 | |

TABLE I-continued

| Solution No. | Thickener | Concentration of Thickener Percent by wt. | Water Soluble Salt | Concentration Water Soluble Salt Percent by Weight | |
|---|---|---|---|---|---|
| | | | | Solution #1 | Solution #2 |
| 4 | OMB | 0.5 | $CaCl_2$ | 17.2 | |
| | | | $CaBr_2$ | 43.7 | |
| 5 | OMB | 0.5 | $CaCl_2$ | 15.1 | |
| | | | $CaBr_2$ | 40.7 | |
| | | | $ZnBr_2$ | 6.8 | |
| 6 | OMB and $C_{16}H_{33}N(CH_3)_3Cl$ | 0.38 0.12 | $CaCl_2$ | 15.1 | |
| | | | $CaBr_2$ | 40.7 | |
| | | | $ZnBr_2$ | 6.8 | |
| 7 | OMB | 0.75 | $CaCl_2$ | 17.2 | |
| | | | $CaBr_2$ | 43.7 | |
| 8 | OMB | 1.08 | $CaBr_2$ | 53 | |
| 9 | $C_{18}H_{37}N^+$—pyridinium $Br^-$ | 1.5 | $CaBr_2$ | 53 | |
| 10 | $C_{18}H_{37}N^+(CH_3)(CH_2CH_2OH)_2 Br^-$ | 1.5 | $CaBr_2$ | 53 | |
| 11 | Bis(2-hydroxyethyl)oleylamine | 0.9* | $CaCl_2$ | 10 | 6 |
| | | | $CaBr_2$ | 34 | 28 |
| | | | $ZnBr_2$ | 20 | 33 |
| 12 | Bis(2-hydroxyethyl)soyaamine | 0.9* | $CaCl_2$ | 10 | 6 |
| | | | $CaBr_2$ | 34 | 28 |
| | | | $ZnBr_2$ | 20 | 33 |
| 13 | Bis(2-hydroxyethyl)tallowamine | 0.9* | $CaCl_2$ | 10 | 6 |
| | | | $CaBr_2$ | 34 | 28 |
| | | | $ZnBr_2$ | 20 | 33 |
| 14 | Bis(2-hydroxyethyl)octadecylamine | 0.9* | $CaCl_2$ | 10 | 6 |
| | | | $CaBr_2$ | 34 | 28 |
| | | | $ZnBr_2$ | 20 | 33 |

*0.9 ml of a 75 percent active isopropanol solution of thickener in 35 ml of salt solution.

Examples of other thickeners which can be employed include oleyl methyl bis(hydroxyethyl) ammonium chloride; octadecyl methyl bis(hydroxyethyl) ammonium bromide; octadecyl tris(hydroxyethyl) ammonium bromide; and octadecyldimethylhydroxyethyl ammonium bromide cetyldimethyl hydroxyethyl ammonium bromide; cetyl methyl bis(hydroxyethyl)ammonium salicylate; cetyl methyl bis(hydroxyethyl)ammonium 3,4-dichlorobenzoate; cetyl tris(hydroxyethyl)ammonium iodide; bis(hydroxyethyl) soyaamine; N-methyl, N-hydroxyethyl tallow amine; bis(hydroxyethyl)octadecylamine; cosyl dimethylhydroxyethyl ammonium bromide; cosyl methyl bis(hydroxyethyl) ammonium chloride; cosyl tris(hydroxyethyl) ammonium bromide; docosyl dimethylhydroxyethyl ammonium bromide; docosyl methyl bis(hydroxyethyl)ammonium chloride; docosyl tris(hydroxyethyl)ammonium bromide; hexadexyl ethyl bis(hydroxyethyl)ammonium chloride, hexadecyl isopropyl bis(hydroxyethyl)ammonium iodide; N,N-dihydroxypropyl hexadecylamine, N-methyl, N-hydroxyethyl hexadecylamine; N,N-dihydroxyethyl octadecylamine, N,N-dihydroxypropyl oleylamine; N,N-dihydroxypropyl soya amine; N,N-dihydroxypropyl tallow amine; N-butyl hexadecyl amine; N-hydroxyethyl octadecylamine; N-hydroxyethyl cosylamine; cetylamine, N-octadecyl pyridinium chloride; N-soya-N-ethyl morpholinium ethosulfate; methyl-1-oleyl amido ethyl-2-oleyl imidazolinium-methyl sulfate; methyl-1-tallow amido ethyl-2-tallow imidazolinium-methylsulfate.

It has been found that as the concentration of the soluble salt in the aqueous solution increases the thickener should be more hydrophilic. This can be achieved by employing thickeners having a specific combination of $R_1$ and $R_2$–$R_4$ groups to provide such hydrophillic character. It has also been found that the $X^-$ component of the thickener affects, to some degree, the effectiveness of the thickener in specific aqueous solutions. For example, organic anions ($X^-$) generally are found to function more effectively in lower density fluids, e.g., less than 49% $CaBr_2$, because of their solubility. Thickeners having an inorganic anion constituent are generally more effective over a broader density range than are thickeners containing an organic anion.

To prepare the aqueous wellbore service fluid of the present invention, the thickener is added to an aqueous solution to which has been dissolved a quantity of at least one water soluble salt to provide a solution having a desired density. Standard mixing procedures known in the art can be employed since heating of the solution and special agitation conditions are normally not necessary. Of course, if used under conditions of extreme cold such as found in Alaska, normal heating procedures should be employed. It has been found in some instances preferable to dissolve the thickener into a lower molecular weight alcohol prior to mixing it with the aqueous solution. The lower molecular weight alcohol (e.g., isopropanol) functions as an aid to solublize the thickener. Other such agents can also be employed. A defoaming agent such as a polyglycol may be employed to prevent undesirable foam during the preparation of the service fluid.

In addition to the water soluble salts and thickening agents described hereinbefore, the aqueous wellbore service fluid may contain other conventional constituents which perform specific desired functions, e.g., corrosion inhibitors, propping agents, fluid loss additives, and the like.

The fluids defined herein can be employed in standard wellbore treatment services employing techniques and equipment well known in the art. They may be used to control a well during certain wellbore operations such as during the perforation of liners and the like. They can also be employed as packer fluids, drilling fluids and the like.

The following examples are illustrative of aqueous wellbore service fluids of the present invention.

EXAMPLE 1

The rheological behavior of 0.5 percent oleyl methyl bis(2-hydroxyethyl) ammonium chloride in a 53% aqueous $CaBr_2$ wellbore service fluid over a shear rate range of 0.6–3900 sec$^{-1}$ was determined. The fluid was prepared by combining

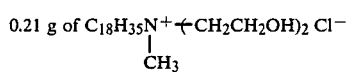

(added as 0.29 g of commercially available 75% active Ethoquad O/12) with 39.63 g of 53% $CaBr_2$ aqueous solution.

The solution was prepared by adding the Ethoquad O/12 to the 53% $CaBr_2$ solution and shaking on a mechanical shaker overnight at room temperature. A clear, very viscoelastic solution with a layer of stable foam on top resulted from this procedure.

The viscosity of the so prepared fluid was measured at three temperatures (approx. 23° C., 43° C. and 60° C.) as a function of shear rate. The lowest shear rate (0.66 sec$^{-1}$) measurement was determined employing a Brookfield LTV viscometer with a UL adaptor. Twenty milliliters (ml) of solution were slowly removed from the bottom of a sample bottle to avoid introducing foam into the annulus between the rotating cylindrical bob and the stationary cup wall. The calculated viscosities at the shear rate of 0.6 rpm (0.66 sec$^{-1}$) are tabulated below in Table II for the three temperature. The readings changed with time so the viscosity in centipoise (cps) is reported in Table II as a range and not as a single value. This characteristic indicates the elastic, non-Newtonian nature of the solution.

TABLE II

| Temperature °C. | No. of Readings | Viscosity (cps) |
|---|---|---|
| 23 | 4 | 470–620 |
| 43 | 3 | 720–750 |
| 59.5–60 | 3 | 370–530 |

The viscosity of samples taken at higher shear rates were measured on a Haake Rotovisco using the NV double-gap cup system. The rotor is a hollow cylinder which fits over a stationary cylindrical stator on the inside with the outer cylindrical stator being the inside wall of the stainless steel cup containing the sample solution. The eight ml of fluid required for the test were delivered from a hypodermic syringe. Torque is recorded on a single pen strip chart at successively increasing shear rates. Shear rate is increased stepwise by increasing the rotor rpm.

Individual torque readings were taken at three temperatures. The temperature, shear rate and calculated viscosities are set forth in the following Table III.

TABLE III

| Temp. | Shear Rate (sec$^{-1}$) | Viscosity (cps) |
|---|---|---|
| 25° C. | 5.4 | 54 |
| " | 10.8 | 81 |
| " | 21.6 | 58.5 |
| " | 43.1 | 45 |
| " | 86.2 | 32.6 |
| " | 173 | 26.4 |
| " | 345 | 20.3 |
| " | 690 | 16.6 |
| " | 1380* | 13.9 |
| " | 1380* | 17.0 |
| " | 2760 | 14.0 |
| " | 173 | 26.4 |
| 43.1 | 5.4 | 169 |
| " | 10.8 | 117 |
| " | 21.6 | 99 |
| " | 43.1 | 86.3 |
| " | 86.2 | 60.8 |
| " | 173 | 37.1 |
| " | 345 | 21.9 |
| " | 690 | 16.1 |
| " | 1380* | 12.2 |
| " | 1380* | 13.4 |
| " | 2760 | 11.4 |
| " | 173 | 38.5 |
| 61.6 | 10.8 | 99 |
| " | 21.6 | 67.5 |
| " | 43.1 | 56.3 |
| " | 86.2 | 40.5 |
| " | 173 | 28.4 |
| " | 345 | 20.5 |
| " | 690 | 14.5 |
| " | 1380* | 10.5 |
| " | 1380* | 12.0 |
| " | 2760 | 8.5 |
| " | 173 | 28.7 |

*Duplicate readings at different head scales of the instrument.

EXAMPLE 2

A 40.3% aqueous $CaBr_2$ solution was thickened with 1% of cetyl trimethyl ammonium salicylate, [$C_{16}$—$H_{33}(CH_3)_3N^+$ salicylate$^-$] as follows:

0.131 g of salicylic acid was mixed with 9.47 g of 0.1M $C_{16}H_{33}N^+(CH_3)_3OH^-$ solution and the resulting solution mixed with 30.4 g of a 53% aqueous $CaBr_2$ solution.

After dissolution, a clear, slightly yellow solution of high viscosity was formed.

Viscosity measurements were made on a Brookfield LTV viscometer with UL adaptor and the results are tabulated below:

TABLE IV

| Shear Rate (sec$^{-1}$) | Temp. °C. | No. of Readings | Viscosity (cps) |
|---|---|---|---|
| 0.33 | 23 | 3 | 524–492 |
| 0.66 | 23 | Off Scale | |
| 0.66 | 27.5 | 3 | 317–307 |
| 0.66 | 37.5 | 3 | 145–144 |
| 0.66 | 50 | 3 | 62–66 |

EXAMPLE 3

A quaternary ammonium salt of the formula:

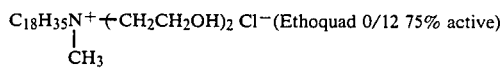

was employed to thicken an aqueous electrolyte solution as follows.

A solution was prepared by mixing 0.33 g Ethoquad O/12 with 49.67 g of a solution containing 17.2% $CaCl_2$/43.7% $CaBr_2$/39.1% $H_2O$, having a density of about 15 ppg. After dissolving by mechanically shaking, there was some foam. The aqueous solution also contained 0.4 percent by weight of a corrosion inhibitor comprising a mixture of N-octyl pyridinium bromide and ammonium thiocyanate. Using the procedures of Example 1, the rheology of the fluid was measured on the Haake Rotovisco NV system and the calculated viscosity and shear rate data is set forth in the following Table V.

TABLE V

| Temp. | Shear Rate (sec$^{-1}$) | Viscosity (cps) |
|---|---|---|
| 25.3° C. | 43.1 | 49.5 |
| " | 86.2 | 47.3 |
| " | 173 | 44.7 |
| " | 345* | 40.8 |
| " | 345* | 41.8 |
| " | 690 | 43.6 |
| " | 1380* | 38.5 |
| " | 1380* | 36.2 |
| " | 2760 | 33.6 |
| " | 3902* | 32.3 |
| " | 3902* | 31.5 |
| " | 1380 | 37.4 |
| " | 690 | 44.6 |
| " | 690 | 39.1 |
| " | 345 | 41.1 |
| " | 173 | 44.4 |
| " | 86.2 | 47.3 |
| 45.5 | 21.6 | 75.6 |
| " | 43.1 | 72 |
| " | 86.2 | 60.8 |
| " | 173 | 50.1 |
| " | 345 | 40.8 |
| " | 345 | 36.5 |
| " | 690 | 35.2 |
| " | 1380 | 29.4 |
| " | 2760* | 26.1 |
| " | 2760* | 24.8 |
| " | 3902 | 23.1 |
| " | 1380 | 30.3 |
| " | 690 | 33.9 |
| " | 345 | 40.9 |
| " | 173 | 50.1 |
| " | 86.2 | 60.8 |
| 62.7 | 10.8 | 126 |
| " | 21.6 | 105.3 |
| " | 21.6 | 117 |
| " | 43.1 | 94.5 |
| " | 86.2 | 77.4 |
| " | 173 | 63.5 |
| " | 345* | 47.3 |
| " | 345* | 49.6 |
| " | 690 | 35.7 |
| " | 1380 | 25.8 |
| 62.7 | 2760 | 19.4 |
| " | 3902* | 18 |
| " | 3902* | 17.3 |
| " | 1380 | 26.1 |
| " | 690 | 35.2 |
| " | 345 | 46.9 |
| " | 173 | 64.5 |
| " | 86.2 | 82.1 |
| " | 43.1 | 105.3 |
| 85.7 | 21.6 | 75.6 |
| " | 43.1 | 71.1 |
| " | 86.2 | 61.4 |
| " | 173 | 48.9 |
| " | 345* | 37.5 |
| " | 345* | 39.1 |
| " | 690 | 30 |
| " | 1380 | 21.9 |
| " | 2760 | 16.6 |
| " | 3902 | 13.7 |
| " | 1380 | 21.3 |
| " | 690 | 29.7 |
| " | 348 | 37.9 |
| " | 173 | 51.1 |

TABLE V-continued

| Temp. | Shear Rate (sec$^{-1}$) | Viscosity (cps) |
|---|---|---|
| " | 86.3 | 64.4 |
| " | 43.1 | 76.5 |

*Duplicate readings at different head scales of the instrument.

EXAMPLE 4

An aqueous solution was made up at room temperature containing 0.33 g of Ethoquad O/12 (Example 1) in 49.67 g of a 15.5 ppg aqueous solution containing 15.1% $CaCl_2$, 40.7% $CaBr_2$, 6.8% $ZnBr_2$ and 37.4% water. The resulting solution was clear and viscous. Viscosity measurements are set forth in the following Table VI.

A similar solution was prepared at room temperature as above except that a mixture of amines was employed. The solution contained 0.25 g of Ethoquad O/12, 0.13 g of $C_{16}H_{33}N^+(CH_3)_3Cl^-$ (Arquad 16–50/50% active) and 49.62 g of the 15.5 ppg density aqueous solution defined directly hereinbefore. The so prepared solution was viscous and clear. Viscosity measurements were made as described directly hereinbefore and are set forth in the following Table VII.

The solution containing the mixture of thickening agents demonstrated higher viscosities than did the solution containing the single thickener. This demonstrates the flexibility of being able to control the viscosity of high density aqueous fluids by the practice of the present invention.

TABLE VI

| Temp. °C. | Shear Rate (sec$^{-1}$) | Viscosity (cps) |
|---|---|---|
| 25 | 10.8 | 133 |
| " | 21.6 | 113 |
| " | 43.1 | 93.9 |
| " | 86.2 | 80.8 |
| " | 173 | 68.5 |
| " | 345* | 44.4 |
| " | 345* | 47.6 |
| " | 690 | 29.7 |
| " | 1380 | 21.2 |
| " | 2760 | 16.6 |
| " | 3902 | 15.0 |
| " | 1380 | 21.5 |
| " | 345 | 44.5 |
| " | 173 | 75.7 |
| " | 21.6 | 111.9 |
| 45 | 21.6 | 82.9 |
| " | 43.1 | 74.3 |
| " | 86.2 | 63.8 |
| " | 173 | 54.2 |
| " | 345* | 40.3 |
| " | 345* | 40.5 |
| " | 690 | 27.3 |
| " | 1380 | 18.4 |
| " | 2760 | 12.9 |
| " | 3902 | 11.4 |
| " | 345 | 40.0 |
| 65 | 43.1 | 26.6 |
| " | 86.2 | 27.4 |
| " | 173 | 27.4 |
| " | 345 | 24.6 |
| " | 690* | 19.8 |
| " | 690* | 20.0 |
| " | 1380 | 14.9 |
| " | 2760 | 10.9 |
| " | 3902 | 9.7 |
| 87 | 173 | 4.4 |
| " | 345 | 4.2 |
| " | 690 | 4.4 |
| " | 1380 | 5.0 |
| " | 2760 | 6.8 |
| " | 3902 | 7.2 |
| " | 2760 | 6.5 |

TABLE VI-continued

| Temp. °C. | Shear Rate (sec$^{-1}$) | Viscosity (cps) |
|---|---|---|
| " | 1380 | 5.6–5.1 |

*Duplicate readings at different head scales of the instrument.

TABLE VII

| Temp. °C. | Shear Rate (sec$^{-1}$) | Viscosity (cps) |
|---|---|---|
| 25 | 10.8 | 344 |
| " | 21.6 | 260 |
| " | 43.1 | 164 |
| " | 86.2 | 102 |
| " | 173 | 63.8 |
| " | 345* | 42.1 |
| " | 345* | 48.7 |
| " | 690 | 37.8 |
| " | 1380 | 31.1 |
| " | 2760 | 23.7–20.3 |
| " | 3902 | 18.6–26.3 |
| " | 1380 | 38.5 |
| " | 345 | 75.7 |
| " | 173 | 105 |
| " | 86 | 173 |
| " | 86 | 153 |
| 55.2 | 10.8 | 266 |
| " | 21.6 | 167 |
| " | 32.7 | 128 |
| " | 86.2 | 101 |
| " | 172* | 79.2 |
| " | 172* | 86.5 |
| " | 345 | 67.6 |
| " | 690 | 43.3 |
| " | 1380 | 40.5 |
| " | 2760 | 34.7 |
| " | 3902 | 33.5 |
| " | 1380 | 50.7 |
| " | 345 | 62.2 |
| " | 173 | 69.4 |
| 89 | 10.8 | 117 |
| " | 21.6 | 78.3 |
| " | 32.7 | 47 |
| " | 86.2 | 31.3 |
| " | 173 | 22 |
| " | 345 | 12.5 |
| " | 690 | 7.8 |
| " | 1380 | 5.5 |
| " | 2760 | 4.1 |
| " | 3902* | 4.3 |
| " | 3902* | 4.3 |
| " | 690 | 4.3 |

*Duplicate readings at different head scales of the instrument.

The following illustrates the fact that the amount of thickener and mixtures thereof which are effective can vary and that preliminary screening tests should be made prior to field use. The same thickening agent was employed as in the immediately preceding Example 4 except in different proportion: 0.17 g of Ethoquad 0/12 and 0.25 g Arquad 16–50 were mixed with 49.58 g of the same 15.5 ppg density solution defined in Example 4 hereinbefore. A very thick and viscoelastic fluid was formed. However, there was some insoluble materials floating on top. Upon heating to 70° C., the viscosity became low and the solution became unstable and formed two distinct phases. The fluid would not find general utility as a wellbore service fluid as contemplated herein.

EXAMPLE 5

A variety of different thickeners were screened to determine their effectiveness to thicken an aqueous solution containing 53% by weight of $CaBr_2$. The characteristics of the resulting fluids are tabulated in the following Tables VIII, IX and X. When viscosity data is shown, it was calculated employing data generated on a Haake Rotovisco NV system as described hereinbefore and set forth in one of the following Tables IX and X.

TABLE VIII

| Constituent 1.5% wt | Temp. °C. | Viscosity | Remarks |
|---|---|---|---|
| A. $C_{16}H_{33}N^+(CH_3)_3Cl^-$ (Arquad 16-50) | Room | Low | Clear solution. Doesn't crystallize |
| B. $C_{18}H_{37}N^+(CH_3)_3Cl^-$ (Arquad 18-50) | Room | Some, not viscoelastic | Clear solution but crystallizes on standing at room temperature |
| C. $C_{16}H_{33}^+N$-pyridinium $Br^-$ | Room | Low | Cloudy solution |
| $C_{16}H_{33}^+N$-pyridinium $Br^-$ | 45–50 | Some, not viscoelastic | Clear solution |
| $C_{16}H_{33}^+N$-pyridinium $Br^-$ | 70 | Less than at 50° C. | Clear solution |
| D. $C_{18}H_{37}^+N$-pyridinium $Br^-$ | 30 | Table IX | Opaque paste - crystallization |
| $C_{18}H_{37}^+N$-pyridinium $Br^-$ | 60 | Table IX | Clear solution |

TABLE VIII-continued

| Constituent 1.5% wt | Temp. °C. | Viscosity | Remarks |
|---|---|---|---|
| $C_{18}H_{37}{}^+N\text{-pyridinium}\;Br^-$ | 90 | Table IX | Clear solution |
| E. $C_{18}H_{37}N^+(CH_2CH_2OH)_2Br^-$ / $CH_3$ | Room | Table X | Clear, but crystallizes with time |
| $C_{18}H_{37}N^+(CH_2CH_2OH)_2Br^-$ / $CH_3$ | 60 | Table X | Clear solution |
| $C_{18}H_{37}N^+(CH_2CH_2OH)_2Br^-$ / $CH_3$ | 90 | Table X | Clear solution |

TABLE IX

| Temp. °C. | Shear Rate (sec$^{-1}$)* | Viscosity (cps)* |
|---|---|---|
| 30 | 5.4 | 492.6** |
| " | 10.8 | 349.2 |
| " | 21.6 | 219 |
| " | 43.1 | 187.4 |
| " | 86.2 | 300.1 |
| " | 172.5 | 273.1 |
| " | 345 | 136.6 |
| " | 689.9 | 106.9 |
| 60 | 5.4 | 2728.9 |
| " | 21.6 | 1131.3 |
| " | 86.2 | 533.3 |
| " | 172.5 | 328.2 |
| " | 345 | 185.1 |
| " | 689.9 | 129.3 |
| " | 1379.8 | 73.7 |
| " | 2759.7 | 39.9 |
| 90 | 5.4 | 1278.2 |
| " | 10.8 | 1035 |
| " | 21.6 | 794.5 |
| " | 86.2 | 347.6 |
| " | 172.5 | 211.6 |
| " | 689.9 | 73.7 |
| " | 1379.8 | 44.7 |
| " | 2759.7 | 23.3 |

*Data as printed out from computer interfaced with Rotovisco NV.
**Since thickener was not entirely in solution, the lower viscosities were expected.

TABLE X

| Temp. °C. | Shear Rate (sec$^{-1}$)* | Viscosity (cps)* |
|---|---|---|
| 30 | 5.4 | 1830.8 |
| " | 21.6 | 561.3 |
| " | 86.2 | 161.9 |
| " | 172.5 | 86.4 |
| " | 345 | 57.2 |
| " | 1379.8 | 15.7 |
| 60 | 5.4 | 1287.5 |
| " | 10.8 | 676.5 |
| " | 43.1 | 215.5 |
| " | 86.2 | 455.5 |
| " | 172.5 | 281.7 |
| " | 689.9 | 95.8 |
| " | 1379.8 | 56.5 |
| 90.3 | 5.4 | 1555.6 |
| " | 10.8 | 1254.8 |
| " | 21.6 | 872.2 |
| " | 86.2 | 261.2 |
| " | 172.5 | 149 |
| " | 689.9 | 47.5 |
| " | 1379.8 | 27.9 |
| " | 2759.7 | 17.1 |
| " | 3902.4 | 13.7 |

*Data as printed out from computer interfaced with Rotovisco NV.

EXAMPLE 6 AND COMPARATIVE TESTS

An electrolyte solution of about 16 ppg density was prepared containing 14% $ZnBr_2$; 37% $CaBr_2$; 12% $CaCl_2$ and 37% water. The fluid loss property of this fluid was determined employing a thickener as described hereinafter. A particulate fluid loss additive was also employed in some of the tests. The particulate fluid loss additive comprised a mixture of particulate aliphatic hydrocarbon resins. A comparative series of tests were run employing hydroxy ethyl cellulose as a fluid loss additive. The fluid loss tests were run on Brea Sandstone according to the API-RP39 standard fluid loss test using 1 inch by 1 inch Brea sandstone instead of filter paper. All the tests were conducted at 150° F. and 600 psi. The thickener consisted of Ethoquad 0/12 (Example 1). To each 300 ml fluid sample containing the thickener, one drop of polypropylene oxide was added to control foaming. As a comparison, several solutions containing hydroxyethyl cellulose were tested in the same manner. The hydroxyethyl cellulose was a commercially available product purchased under the trademark Vatrosol 250HHR. The results of these tests are set forth in the following Table XII. This data illustrates the favorable fluid loss properties achieved by the practice of the invention.

TABLE XII

| Time (Minutes) | Fluid Loss (milliliters) |
|---|---|
| A. Test Solution-1% Thickener | |
| 1 | 2.6 |
| 4 | 6.4 |
| 9 | 12.6 |
| 16 | 21.2 |
| 25 | 32.6 |
| 30 | 39.0 |
| B. Test Solution-1% Thickener and 0.5% Particulate Fluid Loss Additive | |
| 1 | 1.0 |
| 4 | 1.6 |
| 9 | 2.0 |
| 16 | 2.6 |
| 25 | 3.0 |
| 30 | 3.2 |
| C. Test Solution (0.22%) Hydroxyethyl Cellulose | |
| 1 | 4.6 |
| 4 | 14.0 |
| 9 | 30.0 |
| 16 | 57.0 |
| 25 | 95.0 |
| 30 | Not measured |
| D. Test Solution-1.5 lb/gal (0.22%) Hydroxyethyl Cellulose plus 5% Particulate Fluid Loss Additive | |

TABLE XII-continued

| Time (Minutes) | Fluid Loss (milliliters) |
| --- | --- |
| 1 | 3.6 |
| 4 | 8.0 |
| 9 | 11.0 |
| 16 | 12.2 |
| 25 | 13.0 |
| 30 | 13.2 |
| E. Test Solution-0.2% Thickener | |
| 1 | 2.4 |
| 4 | 7.0 |
| 9 | 15.6 |
| 16 | 27.0 |
| 25 | 47.0 |
| 30 | 59.0 |
| F. Test Solution-0.2% Thickener plus 1.5% Particulate Fluid Loss Additive | |
| 1 | 1.0 |
| 4 | 7.0 |
| 9 | 3.2 |
| 16 | 4.8 |
| 25 | 7.2 |
| 30 | 8.4 |

EXAMPLE 7 AND COMPARATIVE TESTS

Several thickening agents were evaluated for use in aqueous fluids having densities of greater than 15 ppg. In each example (data set forth in the following Table XII), 0.9 ml of a thickener was added to 35 ml of the indicated high density fluid. The thickener was employed as a 75 percent active solution in isopropanol. The resulting mixtures were shaken on a mechanical shaker for 3 hours and three days later the viscosities were measured at room temperature (about 75° F.) employing a Brookfield viscometer at a shear rate of 60 rpm employing a number 2 or 4 spindle. The data employing the number 4 spindle is marked with an asterisk. The data indicates that the thickening agents were more effective in the higher density fluids.

The results are tabulated in the following Table XII.

TABLE XII

| Thickening Agent | Viscosity (cps) | | |
| --- | --- | --- | --- |
| | 15.5 ppg (2) | 16.5 ppg (3) | 17.5 ppg (4) |
| bis(2-hydroxyethyl)-oleylamine | 45 | 3250* | 850* |
| bis(2-hydroxyethyl)-soyaamine | 40 | 2500* | 550* |
| bis(2-hydroxyethyl)-tallowamine | 40 | 1900* | 420 |
| bis(2-hydroxyethyl)-octadecylamine | 45 | 300* | 60 |
| none | 28 | 25 | 25 |
| none | 50* | 40* | 40* |

(2) Solution contained 15% $CaCl_2$; 41% $CaBr_2$; 6% $ZnBr_2$ and 38% $H_2O$.
(3) Solution contained 10% $CaCl_2$; 34% $CaBr_2$; 20% $ZnBr_2$ and 36% $H_2O$.
(4) Solution contained 6% $CaCl_2$; 28% $CaBr_2$; 33% $ZnBr_2$ and 33% $H_2O$.

EXAMPLE 8

A solution was prepared by dilution of a 40 g sample of 1.5% solution (0.6 g of $C_{22}H_{45}(CH_3)_2N^{\oplus}C_2H_4OHBr^{\ominus}$ +39.4 g of 17.5 ppg fluid) with 80 g of 17.5 ppg fluid to provide 0.5% of the surfactant in the solution. The 17.5 ppg fluid contained 6% CaCl; 28% $CaBr_2$; 33% $ZnBr_2$, and the remainder water. The sample was heated to approximately 85° C. with occasional shaking to produce a clear, homogeneous solution which was hazy at room temperature. The viscosity was measured in a Haake Rotovisco as described in Example 1. These data are tabulated in Table XIII and show good thickening at room and intermediate temperatures, and falling off at 85° C. The viscosities are from a computer printout interface with the Haake Rotovisco.

TABLE XIII

| Temp. °C. | Shear Rate (sec$^{-1}$) | Viscosity (cps) |
| --- | --- | --- |
| 26 | 5.4 | 1025 |
| " | 10.8 | 789.7 |
| " | 21.6 | 439.2 |
| " | 43.1 | 241.7 |
| " | 86.2 | 149.7 |
| " | 172.5 | 107.1 |
| " | 345 | 67.6 |
| " | 689.9 | 48.9 |
| " | 1379.8 | 38.7 |
| " | 2759.7 | 31.8 |
| " | 3902.4 | 29.6 |
| 54 | 5.4 | 635 |
| " | 10.8 | 436.7 |
| " | 21.6 | 317.5 |
| " | 43.1 | 405.3 |
| " | 86.2 | 166.6 |
| " | 172.5 | 64.9 |
| " | 345 | 35.7 |
| " | 689.9 | 25.1 |
| " | 1379.8 | 17 |
| " | 2759.7 | 14.1 |
| " | 3902.4 | 13.2 |
| 85.5 | 86.2 | 10.1 |
| " | 172.5 | 9.3 |
| " | 345 | 8.7 |
| " | 689.9 | 8.4 |
| " | 1379.8 | 8.4 |
| " | 2759.7 | 7.1 |
| " | 2759.7 | 9.7 |
| " | 3902.4 | 10.4 |

EXAMPLE 9

A solution was prepared by diluting a 50 g sample of 1.5% solution (0.75 g of $C_{20}H_{41}(CH_3)_2N^{\oplus}C_2H_4OHBr^{\oplus}$ +49.25 g of 19.2 ppg fluid) with 50 g of 19.2 ppg fluid to provide 0.75% of the thickening agent in the fluid. The fluid contained 56% $ZnBr_2$, 19% $CaBr_2$ and 25% $H_2O$. The sample was heated to 85° C. to provide rapid dissolution. The appearance at this temperature was a clear viscous solution which was also clear when cooled to room temperature (21°-22° C.). After standing a number of days, the sample tended to become hazy although warming (approximately 30°-35° C.) restored the original clear appearance. The viscosity of the fluid was determined as a function of shear rate on a Haake Rotovisco with a computer printout as previously described. The results are set forth in the following Table XIV.

TABLE XIV

| Temp. °C. | Shear Rate (sec$^{-1}$) | Viscosity (cps) |
| --- | --- | --- |
| 27 | 10.8 | 104.8 |
| " | 21.6 | 116.8 |
| " | 43.1 | 87.8 |
| " | 86.2 | 66.5 |
| " | 172.5 | 50.1 |
| " | 345 | 39.4 |
| " | 689.9* | 34.3 |
| " | 689.9* | 34.3 |
| " | 1379.8 | 29.5 |
| " | 2759.7 | 25.8 |
| " | 3902.4 | 24.5 |
| 55 | 5.4 | 138.6 |
| " | 10.8 | 125.7 |
| " | 5.4 | 138.6 |
| " | 10.8 | 125.7 |
| " | 21.6 | 123.3 |
| " | 43.1 | 117.2 |

TABLE XIV-continued

| Temp. °C. | Shear Rate (sec$^{-1}$) | Viscosity (cps) |
|---|---|---|
| " | 86.2 | 99.3 |
| " | 172.5 | 79.1 |
| " | 345 | 63.8 |
| " | 689.9 | 46.5 |
| " | 1379.8 | 35.7 |
| " | 2759.7 | 27.6 |
| " | 3902.4 | 24.6 |
| 85 | 21.6 | 50.8 |
| " | 43.1 | 47.1 |
| " | 86.2 | 44.3 |
| " | 172.5 | 42.6 |
| " | 345 | 39.1 |
| " | 689.9* | 36.8 |
| " | 689.9* | 36.8 |
| " | 1379.8 | 31 |
| " | 2759.7 | 25.6 |
| " | 3902.4 | 22.9 |

*Duplicate readings at different heat scale of instrument.

What is claimed is:

1. An aqueous wellbore service fluid comprising: water, a sufficient quantity of at least on water soluble salt to increase the density of said fluid to within a range of from about 12 ppg to about 21 ppg and a sufficient quantity of at least one thickener soluble in said fluid to increase the viscosity of said fluid to at least 50 percent over the viscosity of the salt containing fluid, said thickener being a quaternary ammonium salt corresponding to the formula

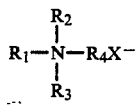

wherein
  $R_1$ is at least about a $C_{16}$ aliphatic group which may be branched or straight chained and which may be saturated or unsaturated;
  $R_2$, $R_3$, and $R_4$ are each independently, a $C_1$ to about $C_6$ aliphatic group which can be branched or straight chained, saturated or unsaturated and which may be substituted with a group which renders the $R_2$, the $R_3$ and/or $R_4$ group more hydrophilic and wherein the $R_2$, $R_3$ and $R_4$ groups may be formed into a heterocyclic 5 or 6 member ring structure which includes the nitrogen atom in the ring, and $X^-$ is an inorganic or organic salt forming anion.

2. The wellbore service fluid of claim 1 wherein the density of the fluid is at least about 15 pounds per gallon of fluid.

3. The wellbore service fluid of claim 1 wherein the thickening agent is selected from the group consisting of at least one of $C_{16}H_{33}N(CH_3)_3$ salicylate; $C_{16}H_{33}N^+(CH_3)_3CL^-$;

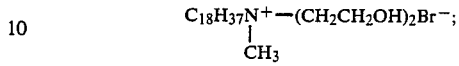

$C_{22}H_{45}(CH_3)_2N^+CH_2CH_2OH$  $Br^-$  and $C_{20}H_{41}(CH_3)_2N^+CH_2CH_2OH$ $Br^-$.

4. An aqueous fluid comprising: water, a sufficient quantity of at least one water soluble salt to increase the density of said fluid to at least 15 ppg and a sufficient quantity of at least one thickener soluble in said fluid to increase the viscosity of said fluid to at least 50 percent over the viscosity of the salt containing fluid, said thickener being a quaternary ammonium salt corresponding to the formula

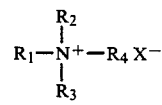

wherein
  $R_1$ is at least about a $C_{16}$ aliphatic group which may be branched or straight chained and which may be saturated or unsaturated;
  $R_2$, $R_3$ and $R_4$ are each independently, a $C_1$ to about $C_6$ aliphatic group which can be branched or straight chained, saturated or unsaturated and which may be substituted with a group which renders the $R_2$, $R_3$ and $R_4$ group more hydrophilic; and wherein the $R_2$, $R_3$ and $R_4$ groups may be formed into a heterocyclic 5 or 6 member ring structure which includes the nitrogen atom, and $X^-$ is an inorganic or organic salt forming anion.

5. The aqueous fluid of claim 4 wherein the thickening agent is selected from the group consisting of at least one of $C_{16}H_{33}N^+(CH_3)_3$ salicylate; $C_{16}H_{33}N^+(CH_3)_3CL^-$;

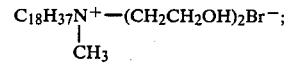

$C_{22}H_{45}(CH_3)_2N^+CH_2CH_2OH$  $Br^-$  and $C_{20}H_{41}(CH_3)_2N^+CH_2CH_2OH$ $Br^-$.

* * * * *